(12) United States Patent
Masuo et al.

(10) Patent No.: US 9,212,891 B2
(45) Date of Patent: Dec. 15, 2015

(54) METHOD OF CALIBRATING GEAR MEASURING DEVICE

(75) Inventors: Koichi Masuo, Tokyo (JP); Naohiro Otsuki, Tokyo (JP); Yoshikoto Yanase, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 589 days.

(21) Appl. No.: 13/581,058

(22) PCT Filed: Mar. 25, 2011

(86) PCT No.: PCT/JP2011/057279
§ 371 (c)(1),
(2), (4) Date: Nov. 6, 2012

(87) PCT Pub. No.: WO2011/125533
PCT Pub. Date: Oct. 13, 2011

(65) Prior Publication Data
US 2013/0054172 A1  Feb. 28, 2013

(30) Foreign Application Priority Data
Apr. 2, 2010  (JP) ................................. 2010-085661

(51) Int. Cl.
| | | |
|---|---|---|
| *G01B 21/16* | (2006.01) | |
| *G01B 21/20* | (2006.01) | |
| *G06F 19/00* | (2011.01) | |
| *G01B 5/20* | (2006.01) | |
| *G01B 21/04* | (2006.01) | |
| *G01M 13/02* | (2006.01) | |

(52) U.S. Cl.
CPC .............. *G01B 5/202* (2013.01); *G01B 21/042* (2013.01); *G01M 13/021* (2013.01)

(58) Field of Classification Search
CPC ........ G01B 21/042; G01B 5/202; G01B 7/28; G01B 7/283; G01M 13/021
USPC ................ 702/92, 94, 105, 155, 152; 73/162; 33/501.9
See application file for complete search history.

(56) References Cited

U.S. PATENT DOCUMENTS 3,757,425 A * 9/1973 Bouillon et al. ............. 33/501.9
4,852,402 A   8/1989 Bertz

FOREIGN PATENT DOCUMENTS

| JP | 58-100707 A | 6/1983 |
| JP | 63-307313 A | 12/1988 |
| JP | 2-194311 A | 7/1990 |

(Continued)

OTHER PUBLICATIONS

International Search Report and Written Opinion of the International Searching Authority with English Translation.

*Primary Examiner* — John H Le
(74) *Attorney, Agent, or Firm* — Birch, Stewart, Kolasch & Birch, LLP

(57) ABSTRACT

A difference of tooth profile gradient errors ($\Delta\alpha$) is calculated, which is a deviation between the tooth profile gradient error ($\alpha 1$) when the tooth profile of a gear is calculated by a method of scanning in a tangential direction of a base circle; and the tooth profile gradient error ($\alpha 2$) when the tooth profile of a gear is calculated by scanning methods other than a method of scanning in a tangential direction of a base circle. The position error ($\Delta x$) is calculated using the difference of tooth profile gradient errors ($\Delta\alpha$) and gear specifications, and the position of the gauge head is calibrated depending on the position error ($\Delta x$). Hereby the position of the gauge head can be calibrated without using a mechanical reference member.

2 Claims, 8 Drawing Sheets

(56) References Cited

FOREIGN PATENT DOCUMENTS

| JP | 5-111851 A | 5/1993 |
| JP | 9-178461 A | 7/1997 |
| JP | 2010-117196 A | 5/2010 |
| WO | WO 2010/122680 A1 | 10/2010 |

* cited by examiner

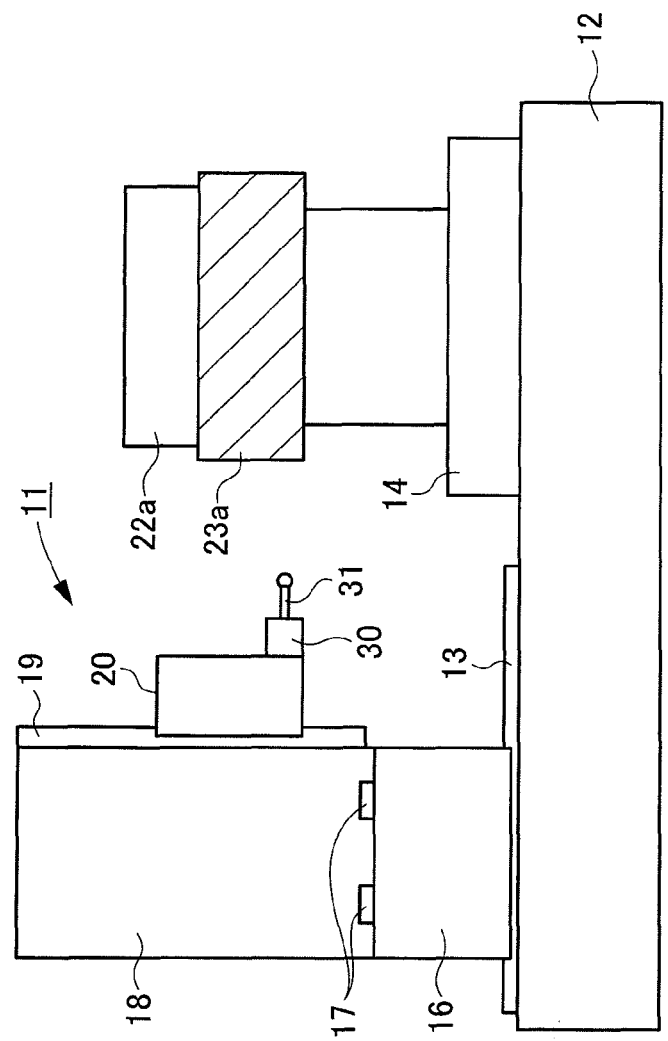

METHOD OF CALIBRATING GEAR MEASURING DEVICE

TECHNICAL FIELD

The present invention relates to a method of calibrating a gear measuring device and is designed so that the position of a gauge head can be calibrated without using any mechanical reference member such as a reference block.

BACKGROUND ART

A gear processing machine is a machine which processes workpiece gears, and specific examples thereof include a gear profile grinding machine and a hobbing machine, which fabricate gears by cutting processing, and a gear grinding machine, which grinds gears after quenching.

When small workpiece gears are to be processed in mass production by such a gear processing machine, the workpiece gear which is the first processed product is subjected to tooth profile measurement or tooth thickness measurement, and the precision thereof is then checked. If the precision is good, remaining unprocessed lots are processed. If the precision is not good, the remaining unprocessed lots are processed after processing precision is corrected. In the gear processing machine that does not have a gear measuring function, only base tangent lengths and over-pin diameters can be checked; therefore, the first product sometimes lacks precision.

If a workpiece gear to be processed is large, a defective product is not allowed to be produced. Therefore, while machining allowance is caused to remain, processing and measurement are repeated several times, final processing precision is checked, and, then, finishing processing is carried out. Long working time is required since reattaching operation of the large gear between a gear processing machine and a gear measuring machine is required in order to repeat the processing and measurement.

The tooth profile measurement and the tooth thickness measurement with respect to the workpiece gears are carried out by a gear measuring device provided with a measuring instrument having a gauge head (probe).

Conventionally, such a gear measuring device has been generally composed as a device separated from the gear processing machine. When the gear measuring device is separated from the gear processing machine, the operation of reattaching the workpiece gear from the gear processing machine to the gear measuring device is required.

On the other hand, recently, in order to omit the above described reattaching operation to improve workability, various gear processing machines each integrally provided with a gear measuring device have been proposed so that the tooth profile measurement and the tooth thickness measurement can be carried out on the machine with respect to workpiece gears after processing (for example, see Patent Literature 1).

Even when the gear measuring device is integrated with or separated from the gear processing machine, in the gear measuring device, when a gauge head (probe) of a measuring instrument is brought into contact with a workpiece gear, a position signal indicating a position at which the gauge head is in contact with the workpiece gear is output from the measuring instrument. The tooth profile and the tooth thickness can be measured by changing the position at which the gauge head is brought into contact with the workpiece gear and subjecting the position signals at the positions to arithmetic processing.

In this case, if a position signal precisely indicating a reference position is output when the gauge head is positioned at the reference position, precise position measurement can be carried out also when measurement of other positions is carried out.

However, if thermal deformation occurs in the gear measuring device including the measuring instrument due to the surrounding temperature or heat, etc. generated upon processing of the workpiece gear, even when the gauge head is positioned at the reference position with respect to the measuring instrument, an error is generated with respect to the position with respect to the workpiece gear, and the measured position upon measurement is sometimes shifted.

If such a position error of the gauge head is generated, measurement precision is lowered when the tooth profile measurement or tooth thickness measurement is carried out. Particularly, the measurement error is large in the case in which the tooth thickness is measured.

Therefore, upon measurement, correction (calibration) of the position of the gauge head has been carried out.

A conventional calibration method will be explained with reference to FIG. 8.

FIG. 8 shows a gear measuring device 1, which measures a small or medium gear. As shown in the drawing, guide rails 3 extending along an X-axis direction, a rotating table 4, and a support column 5 are disposed on a base 2 of the gear measuring device 1.

A movable body 6 can be moved along the X-axis direction along the guide rails 3. Guide rails 7 extending in a Y-axis direction (in FIG. 8, a direction perpendicular to the paper plane) is disposed on the movable body 6, and a movable body 8 can be moved along the Y-axis direction. Guide rails 9 extending along a Z-axis direction is disposed on the movable body 8, and a movable body 10 can be moved along the Z-axis direction.

A measuring instrument 30 provided with a gauge head 31 is attached to the movable body 10.

Conventionally, in order to carry out calibration, any one of a reference block 21, a test bar 22, and a master work 23 which is a mechanical reference member is installed at a reference position determined in advance.

The reference block 21 is installed in a support arm part of the support column 5, and, in this case, the position at which the reference block 21 is installed serves as a reference position.

The test bar 22 is coaxially installed with respect to an upper surface of the rotating table 4, and, in this case, the position at which the test bar 22 is installed serves as a reference position.

The master work 23 is coaxially installed with respect to the upper surface of the rotating table 4, and, in this case, the position at which the master work 23 is installed serves as a reference position.

When calibration of the position of the gauge head 31 is to be carried out, the gauge head 31 is brought into contact with the mechanical reference member (any one of the reference block 21, the test bar 22, and the master work 23) installed at the reference position, and a position signal output from the measuring instrument 30 at this point is examined. Then, if the position signal is not indicating the reference position, calibration is carried out so that the position signal output at this point indicates the reference position.

CITATION LIST

Patent Literature

Patent Literature 1: Japanese Patent Application Laid-Open No. H5-111851

SUMMARY OF INVENTION

Technical Problem

As shown in FIG. 8, when calibration is to be carried out by using the mechanical reference member, the mechanical reference member (the reference block 21, the test bar 22, or the master work 23) is required, and there has been a problem that the working time for attaching and detaching the reference member is required.

In a gear measuring device which measures a large gear further has a problem as explained below in addition to the above described problem.

FIG. 9 shows a gear measuring device 11 which measures a large gear. In the drawing, a base is denoted by 12; guide rails extending in the X-axis direction, the Y-axis direction, and the Z-axis direction, respectively, are denoted by 13, 17, and 19; a rotating table is denoted by 14; movable bodies which can be moved along the X-axis direction, the Y-axis direction, and the Z-axis direction, respectively, are denoted by 16, 18, and 20; a measuring instrument attached to the movable body 20 is denoted by 30; and a measuring gauge is denoted by 31.

In the gear measuring device 11, no support column is provided in order to reduce installation space.

In the gear measuring device 11 as shown in FIG. 9, it is difficult to install a reference block since no support column is provided. Even if a support arm is provided, the gear measuring device 11 may collide with the large gear when the gear measuring device 11 is moved to bring the gauge head 31 into contact with the reference block since the gear is large.

The gauge head 31 cannot make a stroke to the center of the rotating table 14. Therefore, a large member is required as a test bar 22a.

Also, a large member is required as a master work 23a.

Since large members have to be prepared as the test bar 22a and the master work 23a in this manner, there are a problem that the fabrication cost and storage cost thereof are increased and a problem that the work time for attaching and detaching the test bar 22a and the master work 23a is required every time calibration is carried out.

In view of the above described conventional techniques, it is an object of the present invention to provide a method of calibrating a gear measuring device capable of calibrating the position of a gauge head even with no mechanical reference member.

Solution to Problem

The present invention which solves the above described problems is a method of calibrating a gear measuring device having:
  a measuring instrument that outputs a position signal indicating a position at which a gauge head is in contact with a measurement gear when the gauge head is brought into contact with a tooth surface of the measurement gear and that is driven along directions of three-dimensional directions; and
  an arithmetic means that carries out measurement of the measurement gear by subjecting the position signal to arithmetic processing; the method comprising:
  a step of obtaining a tooth profile of the measurement gear by subjecting the position signal to arithmetic processing and of obtaining a tooth profile gradient error ($\alpha 1$) of the measurement gear from the tooth profile, the position signal output when the gauge head is brought into contact with a tooth surface of the measurement gear when the measurement gear is rotated about a rotational axis thereof in synchronization with movement of the gauge head in a tangential direction of a base circle;
  a step of obtaining a tooth profile of the measurement gear by subjecting the position signal to arithmetic processing and of obtaining a tooth profile gradient error ($\alpha 2$) of the measurement gear from the tooth profile, the position signal output when the gauge head is brought into contact with the tooth surface of the measurement gear when the measurement gear is rotated about the rotational axis thereof in synchronization with movement of the gauge head in a direction other than the tangential direction of the base circle;
  a step of calculating a difference ($\Delta\alpha$) between the tooth profile gradient errors that is a difference between the tooth profile gradient error ($\alpha 1$) and the tooth profile gradient error ($\alpha 2$);
  a step of obtaining a position error ($\Delta x$) of the gauge head by using the difference ($\Delta\alpha$) between the tooth profile gradient errors and using a gear specification of the measurement gear; and
  a step of calibrating the position of the gauge head based on the position error ($\Delta x$).

Moreover, the present invention is the method of calibrating the gear measuring device according to claim 1, wherein,
  in the step of obtaining the position error ($\Delta x$) of the gauge head by using the difference ($\Delta\alpha$) between the gear profile gradient errors and the gear specification of the measurement gear,
  the position error ($\Delta x$) is obtained by using a below expression:

$$\Delta x = \Delta\alpha / \{\tan(\alpha 21 + \alpha A) - \tan(\alpha 22 - \alpha B)\}$$

wherein $\alpha A$ represents a tooth-tip measurement offset angle, $\alpha B$ represents a tooth-root measurement offset angle; and $$\alpha 21 = \tan^{-1}[(Do^2 - Dg^2)^{0.5} + d]/Dg] \text{ and}$$

$$\alpha 22 = \tan^{-1}[(Dr^2 - Dg^2)^{0.5} + d]/Dg]$$

are satisfied when a base-circle diameter of the measurement gear is Dg, an outer diameter is Do, a tooth-root diameter is Dr, and a ball diameter of the gauge head is d.

Note that the tooth-tip measurement offset angle $\alpha A$ and the tooth-root measurement offset angle $\alpha B$ are the angles shown in FIG. 7.

If the radial direction is employed as the direction of moving the gauge head in the direction other than the tangential direction of the base circle, $\alpha A=0$ and $\alpha B=0$ are satisfied (see FIG. 6).

Advantageous Effects of Invention

According to the present invention, the position of the gauge head can be calibrated by arithmetic processing according to the difference between the tooth profile gradient errors of the tooth profile measurement obtained in the two steps, and, when the same tooth is measured in the two steps, the cause of the tooth profile errors can be cancelled out. Therefore, calibration using a workpiece gear is also an option. When calibration can be carried out by using the workpiece gear, the necessity of using the mechanical reference member (reference block, test bar, master work) is eliminated, and the time for attaching/detaching the mechanical reference member can be eliminated.

BRIEF DESCRIPTION OF DRAWINGS

FIG. 9 is a configuration drawing showing a gear measuring device according to a conventional technique.

DESCRIPTION OF EMBODIMENT

Hereinafter, an embodiment of the present invention will be explained based on an example.

EXAMPLE

Figure 1:
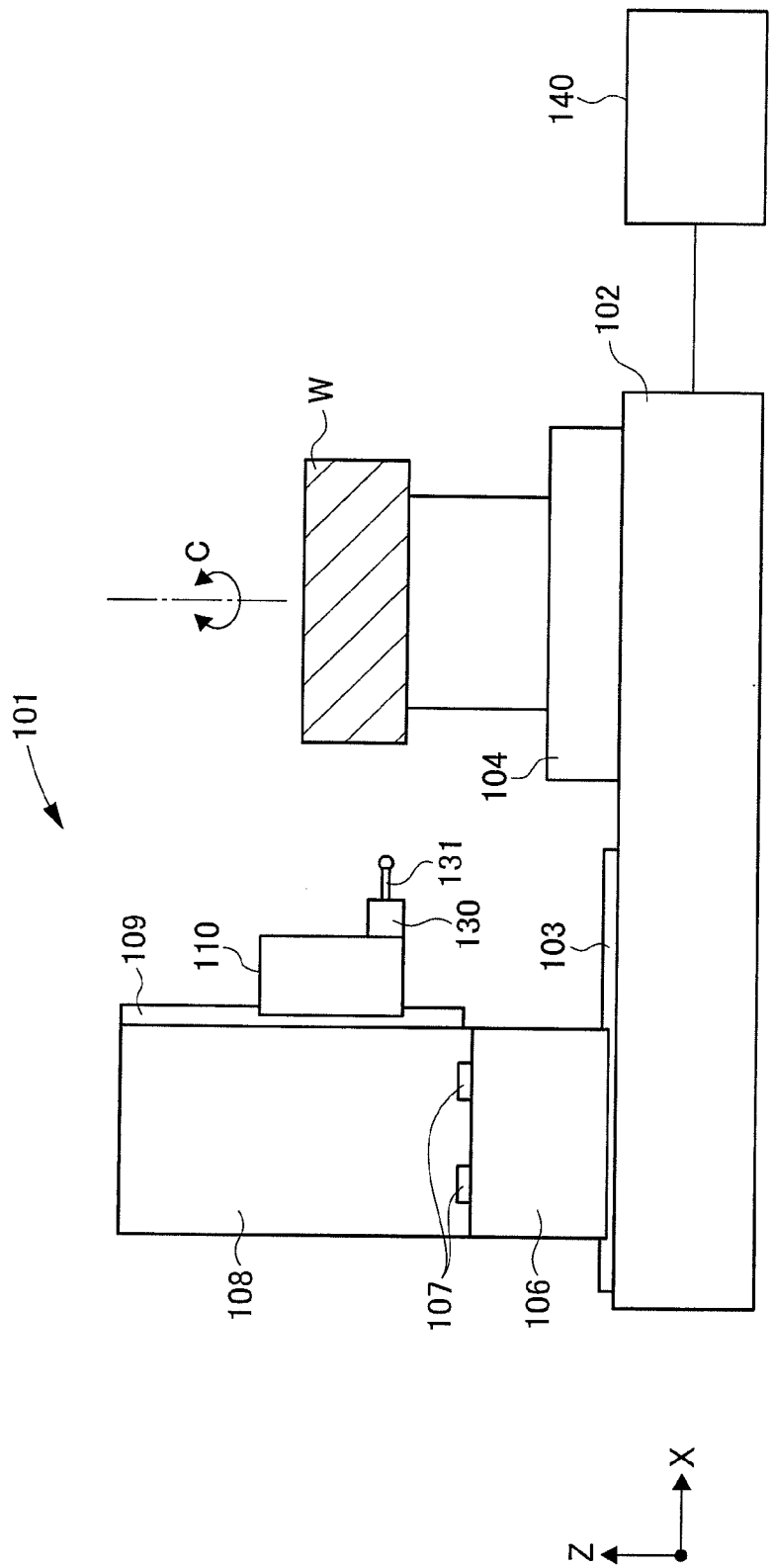
FIG. 1 is a configuration drawing showing a gear measuring device to which a method of the present invention is applied.

FIG. 1 shows a gear measuring device 101 to which a method of the present invention is applied. As shown in the drawing, guide rails 103 extending along an X-axis direction and a rotating table 104 are disposed on a base 102 of the gear measuring device 101.

The rotating table 104 can be rotated about a rotational axis C.

A movable body 106 can be moved along the X-axis direction along the guide rails 103. Guide rails 107 extending in a Y-axis direction (in FIG. 1, a direction perpendicular to the paper plane) are disposed on the movable body 106, and a movable body 108 can be moved along the Y-axis direction. Guide rails 109 extending along a Z-axis direction (vertical direction) are disposed on the movable body 108, and a movable body 110 can be moved along the Z-axis direction.

A measuring instrument 130 provided with a gauge head 131 is attached to the movable body 110. A large ground work (measurement gear, workpiece gear) W (see FIG. 2) is coaxially placed on an upper surface of the rotating table 104.

The measuring instrument 130 (gauge head 131) is driven (moved) along the directions of three dimensions when the movable bodies 106, 108, and 110 are driven along the X-axis, Y-axis, and Z-axis directions, respectively. When the gauge head 131 is brought into contact with the work W, the measuring instrument 130 outputs a position signal indicating the position of contact.

A control arithmetic device 140 is a device which integrally controls the whole gear measuring device 101 and subjects the position signal to arithmetic processing.

More specifically, based on gear specifications of the work W set/stored in advance, the position (coordinates) of the gauge head 131, a tooth-profile measurement position, and a tooth-thickness measurement position, the control arithmetic device 140 controls movement of the movable bodies 106, 108, and 110 in the X, Y, and Z-directions to control movement of the measuring instrument 130 (gauge head 131) in the X, Y, and Z-axis directions and controls the rotation of the rotating table 104, on which the work W is placed, about the rotational axis C.

Furthermore, based on the position signal output from the measuring instrument 130, the control arithmetic device 140 measures a tooth profile and a tooth thickness and carries out calibration of the position of the gauge head 131.

Next, two methods of measuring the tooth profile of the work W, a method of measuring the tooth thickness of the work W, and a method of calibrating the position of the gauge head 131 by using the gear measuring device 101 will be sequentially explained.

Figure 3:
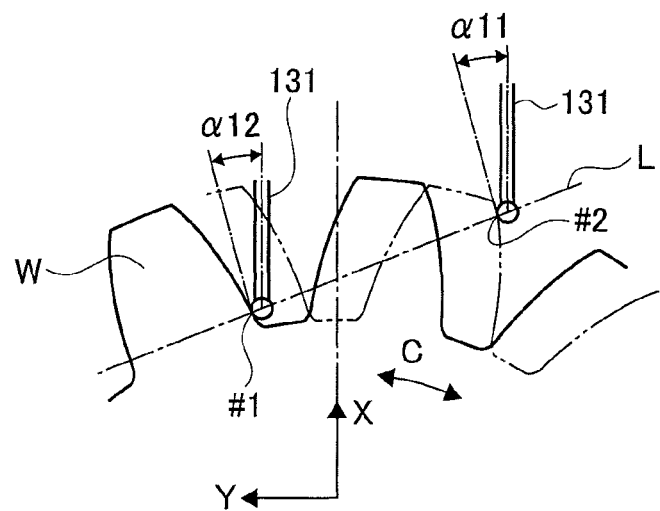
FIG. 3 is a drawing showing a first method of measuring a tooth profile (method of scanning in a tangential direction of a base circle).

First, a first method (a method of scanning in a tangential direction of a base circle) of measuring a tooth profile of the work W will be explained with reference to FIG. 3. In FIG. 3, a tangential line with respect to a base circle is represented by L. A tangential direction of a base circle that serves as a scanning direction is a horizontal direction in a normal gear measuring machine, but may be an oblique direction; and this drawing is drawn so that the tangential direction is an oblique direction.

When tooth profile measurement of the work W is to be carried out by the first method (method of scanning in the tangential direction of the base circle), as shown in FIG. 3, first, after the work W is slightly rotated about the rotational axis C to cause a tooth groove of the work W to be opposed to the measuring instrument 130, the measuring instrument 130 is driven in the X-axis, Y-axis, and Z-axis directions to bring the gauge head 131 thereof into contact with an intersection point with a root circle on the tooth surface of the work W. This intersection point serves as a measurement starting position #1 on the tooth surface.

Subsequently, in the state in which the gauge head 131 is in contact with the measurement starting position #1, the rotating table 104 is driven to rotate the work W about the rotational axis C in synchronization with drive of the measuring instrument 130 in the X-axis and Y-axis directions so that the gauge head 131 is moved along the tangential line L of the base circle.

The gauge head 131 is moved along the tangential line L of the base circle while the gauge head 131 is continuously in contact with the tooth surface of the work W if the gauge head 131 is a probe of an analogue type or while the gauge head 131 is intermittently in contact with the tooth surface of the work W if the gauge head 131 is a digital type (on/off type); as a result, a position signal indicating the each position at which the tooth surface of the work W and the tangential line L of the base circle are intersecting with each other is output from the measuring instrument 130.

Then, at the point when the gauge head 131 reaches the intersection point with an addendum circle on the tooth surface of the work W, the tooth profile measurement is terminated. Therefore, this intersection point serves as a measurement terminating position #2 on the tooth surface.

The control arithmetic device 140 can obtain the tooth profile of the work W by subjecting the position signal output from the measuring instrument 130 to arithmetic processing when the gauge head 131 is moved from the measurement starting position #1 to the measurement terminating position #2. Then, based on the tooth profile obtained by calculation, a tooth profile gradient error $\alpha 1$ of the work W can be obtained.

A contact angle at the measurement starting position #1 is represented by $\alpha 12$, a contact angle at the measurement terminating position #2 is represented by $\alpha 11$, and a position error (positional shift in the X-axis direction) in the case in which the gauge head 131 has a position error is represented by $\Delta x$; in this case, a measurement error $e1$ of the tooth profile gradient error $\alpha 1$ is represented by a below expression (1).

$$e1 = \Delta x(\tan \alpha 11 - \tan \alpha 12) \quad (1)$$

In the tooth profile measurement of the work W by the first method (method of scanning in the tangential direction of the base circle), the tooth surface of the work W and the contact angle of the gauge head 131 are virtually not changed. In other words, α11 and α12 are approximately equal to each other. Therefore, there is a characteristic that almost no measurement error e1 of the tooth profile gradient error α1 is generated even when there is a position error (positional shift in the X-axis direction) Δx.

Next, a second method of measuring the tooth profile of the work W (a method of scanning in a direction other than the tangential direction of the base circle) will be explained with reference to FIG. 4. Herein, the case in which the direction other than the tangential direction of the base circle is a radial direction will be explained.

Figure 4:
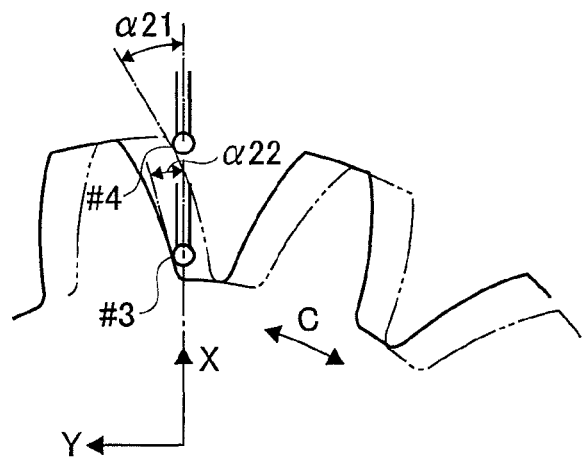
FIG. 4 is a drawing showing a second method of measuring a tooth profile (method of scanning in a radial direction).

When tooth profile measurement of the work W is to be carried out by the second method (method of scanning in the radial direction), as shown in FIG. 4, first, after the work W is slightly rotated about the rotational axis C to cause a tooth groove of the work W to be opposed to the measuring instrument 130, the measuring instrument 130 is driven in the X-axis, Y-axis, and Z-axis directions to bring the gauge head 131 thereof into contact with an intersection point with a root circle on the tooth surface of the work W. This intersection point serves as a measurement starting position #3 on the tooth surface.

Subsequently, in the state in which the gauge head 131 is in contact with the measurement starting position #3, the rotating table 104 is driven to rotate the work W about the rotational axis C in synchronization with drive of the measuring instrument 130 in the X-axis direction so that the gauge head 131 is moved along the radial direction (X-axis direction).

The gauge head 131 is moved in the radial direction (X-axis direction) while the gauge head 131 is continuously in contact with the tooth surface of the work W if the gauge head 131 is a probe of an analogue type or while the gauge head 131 is intermittently in contact with the tooth surface of the work W if the gauge head 131 is a digital type (on/off type); as a result, a position signal indicating the each position at which the tooth surface of the work W and the X-axis (movement trajectory of the gauge head 131) are intersecting with each other is output from the measuring instrument 130.

Then, at the point when the gauge head 131 reaches the intersection point with an addendum circle on the tooth surface of the work W, the tooth profile measurement is terminated. Therefore, this intersection point serves as a measurement terminating position #4 on the tooth surface.

The control arithmetic device 140 can obtain the tooth profile of the work W by subjecting the position signal output from the measuring instrument 130 to arithmetic processing when the gauge head 131 is moved from the measurement starting position #3 to the measurement terminating position #4. Then, based on the tooth profile obtained by calculation, a tooth profile gradient error α2 of the work W can be obtained.

A contact angle at the measurement starting position #3 is represented by α22, a contact angle at the measurement terminating position #4 is represented by α21, and a position error (positional shift in the X-axis direction) in the case in which the gauge head 131 has a position error is represented by Δx; in this case, a measurement error e2 of the tooth profile gradient error α2 is represented by a below expression (2).

$$e2 = \Delta x (\tan \alpha 21 - \tan \alpha 22) \quad (2)$$

In the tooth profile measurement of the work W by the second method (method of scanning in the radial direction), the contact angle between the tooth surface of the work W and the gauge head 131 is changed. In other words, α21 and α22 are different from each other. Therefore, if there is a position error (positional shift in the X-axis direction) Δx, there is a characteristic that the measurement error e2 of the tooth profile gradient error α2 is increased compared with the measurement error e1 in the first method (method of scanning in the tangential direction of the base circle).

Figure 2:
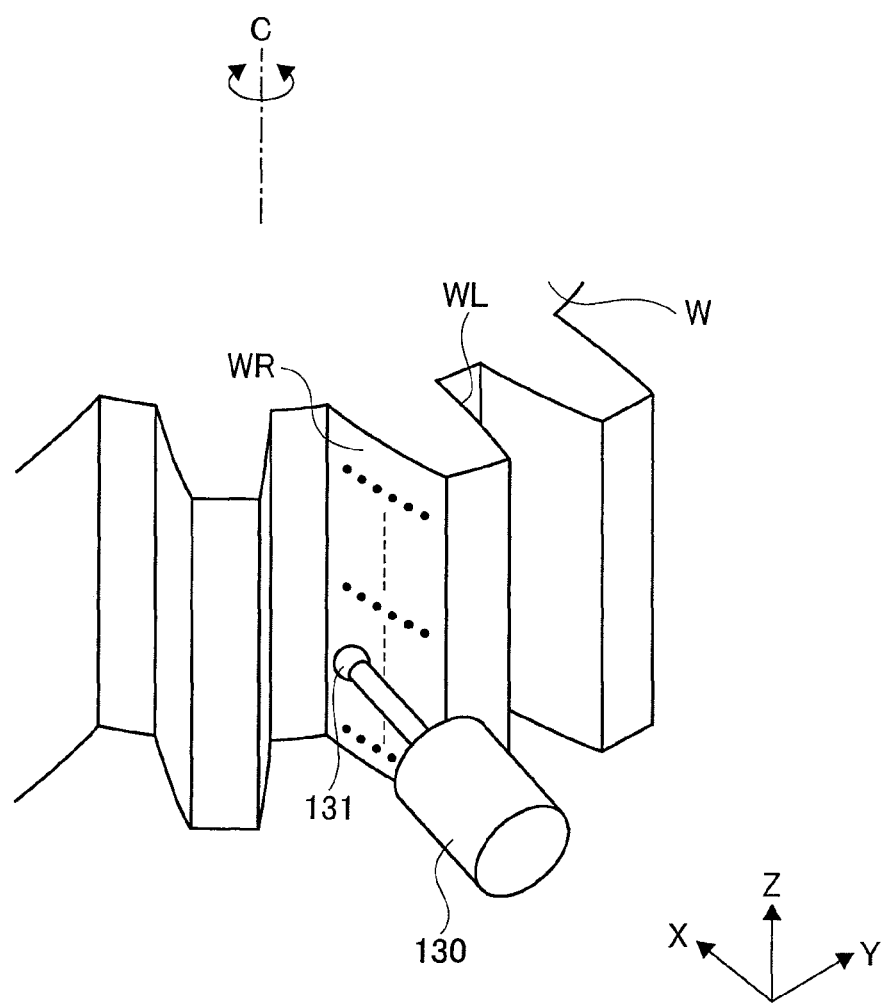
FIG. 2 is a perspective view showing part of a work (measurement gear, workpiece gear).

Next, a method of measuring the tooth thickness of the work W will be explained with reference to FIG. 2.

In order to measure the tooth thickness, the measuring instrument 130 is driven in the X-axis, Y-axis, and Z-axis directions to bring the gauge head 131 into contact with an intersection point intersecting with a pitch circle on a right tooth surface WR of the work W. A position signal output from the measuring instrument 130 at this point is subjected to arithmetic processing by the control arithmetic device 140 to detect the position at this point.

Subsequently, the measuring instrument 130 is driven in the X-axis, Y-axis, and Z-axis directions to bring the gauge head 131 into contact with an intersection point intersecting with the pitch circle on a left tooth surface WL of the work W. The position signal output from the measuring instrument 130 at this point is subjected to arithmetic processing by the control arithmetic device 140 to detect the position at this point.

Then, based on the position of the intersection point on the right tooth surface WL and the position of the intersection point on the left tooth surface WR, the tooth thickness of the work W can be measured.

This case has a characteristic that, if a position error (positional shift in the X-axis direction) Δx is present at the position of the gauge head 131, a measurement error in the tooth thickness is increased.

Figure 5:
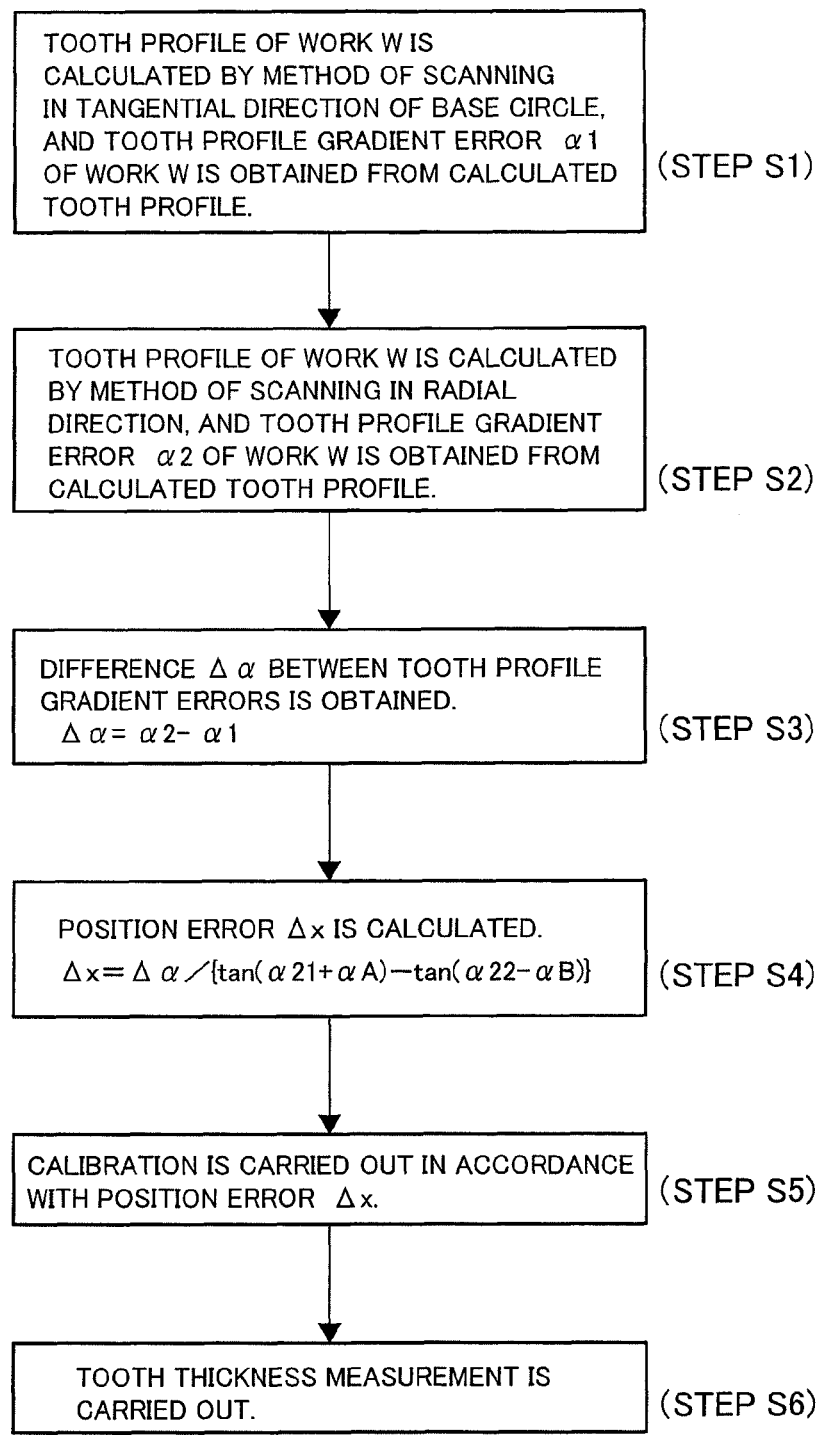
FIG. 5 is a flow chart showing operation of a method of the method of the present invention.

Next, a method of calibrating the position of the gauge head 131 by the method of calibrating the gear measuring device according to the method of the present invention will be explained with reference to a flow chart shown in FIG. 5.

The control arithmetic device 140 obtains the tooth profile of the work W by using the above described first method (method of scanning in the tangential direction of the base circle) of tooth profile measurement of the work W and obtains the tooth profile gradient error α1 of the work W from the tooth profile of the work W obtained by calculation (step S1).

If the position error (positional shift in the X-axis direction) Δx is present at the position of the gauge head 131, the obtained tooth profile gradient error α1 includes the measurement error e1. Herein, α1=αw1+e1 is obtained (αw1 is a true value of the tooth profile gradient error).

The control arithmetic device 140 obtains the tooth profile of the work W by using the above described second method (method of scanning in the radial direction) of tooth profile measurement of the work W and obtains the tooth profile gradient error α2 of the work W from the tooth profile of the work W obtained by calculation (step S2).

If the position error (positional shift in the X-axis direction) Δx is present at the position of the gauge head 131, the obtained tooth profile gradient error α2 includes the measurement error e2. Herein, α2=αw2+e2 is obtained (αw1 is a true value of the tooth profile gradient error).

Note that the order of step S1 and step S2 may be reversed.

Then, the control arithmetic device 140 calculates a difference Δα between the tooth profile gradient errors which is the difference between the tooth profile gradient error α1 obtained in step S1 and the tooth profile gradient error α2 obtained in step S2 (step S3).

This difference $\Delta\alpha$ between the tooth profile gradient errors is represented by a below expression (3).

$$\Delta\alpha = \alpha2 - \alpha1 = (\alpha w1 + e1) - (\alpha w2 + e2) \quad (3)$$

In other words, the difference $\Delta\alpha$ between the tooth profile gradient errors represents the difference between "the tooth profile gradient error $\alpha2$" and "the tooth profile gradient error $\alpha1$".

Herein, in the case in which the same tooth surface is measured in step 1 and step 2, when the fact that $\alpha w1 = \alpha w2$ is obtained and the fact that virtually noel is generated (e1=0) are taken into consideration, $$\Delta\alpha \approx e2 = \Delta x(\tan \alpha21 - \tan \alpha22) \quad (4)$$

can be obtained.

Then, the control arithmetic device 140 calculates the position error (positional shift in the X-axis direction) $\Delta x$ of the gauge head 131 by using a below expression (5) obtained by deforming the expression (4) (step S4).

$$\Delta x = \Delta\alpha/(\tan \alpha21 - \tan \alpha22) \quad (5)$$

Figure 6:
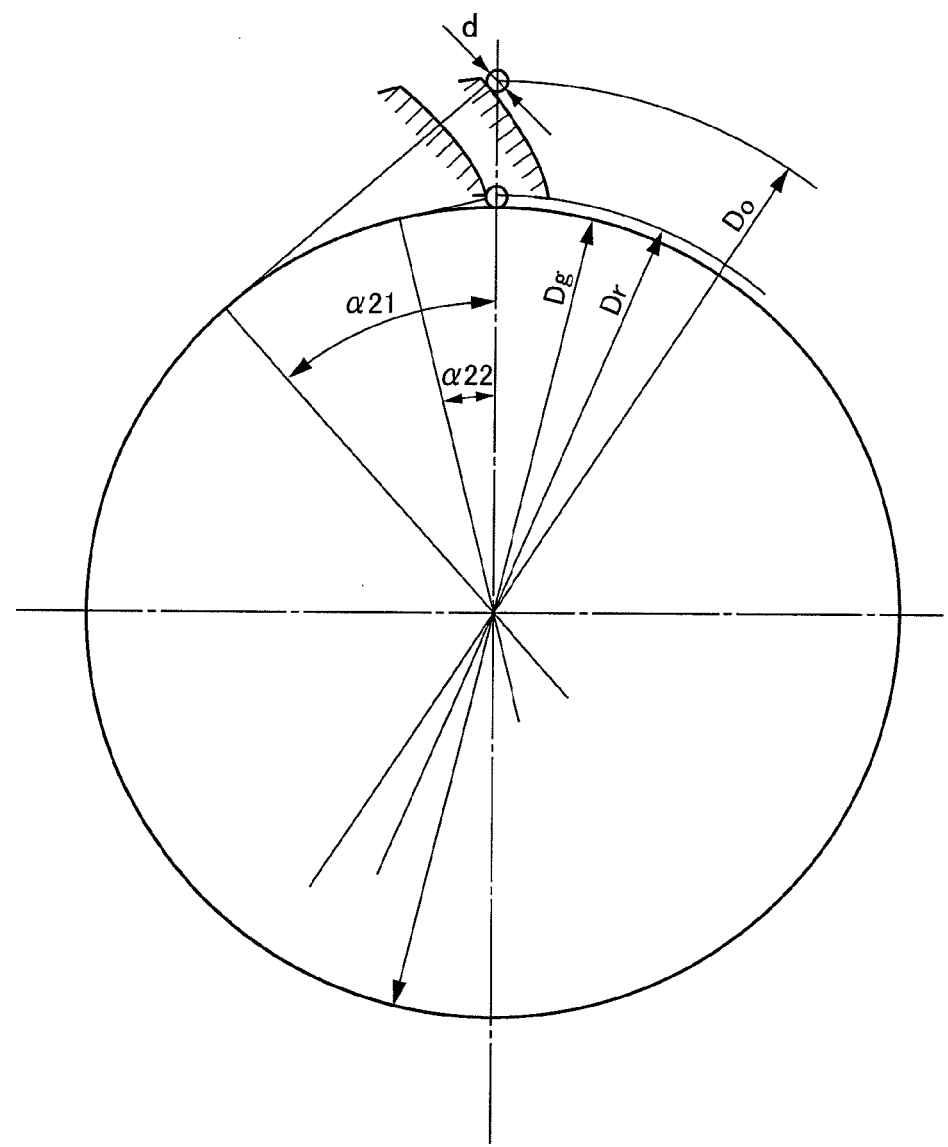
FIG. 6 is a characteristic drawing showing gear specifications of the work.

Herein, a base-circle diameter of the work W is Dg, an outer diameter is Do, a tooth-bottom diameter is Dr, and a ball diameter of the gauge head is d (see FIG. 6). In this case, $\alpha21$ and $\alpha22$ in the expression (4) are the values given by below expressions (6) and (7) (in other words, values given by the gear specifications).

$$\alpha21 = \tan^{-1}[(Do^2 - Dg^2)^{0.5} + d]/Dg] \quad (6)$$

$$\alpha22 = \tan^{-1}[(Dr^2 - Dg^2)^{0.5} + d]/Dg] \quad (7)$$

When the control device 140 calculates the position error (positional shift in the X-axis direction) $\Delta x$ at the position of the gauge head 131 by the above described expression (5), the control device 140 determines that the position signal output from the detecting instrument 130 includes a value corresponding to the position error $\Delta x$.

Then, in accordance with the value of the position error $\Delta x$, the control device 140 carries out calibration with respect to the stored position (coordinates) of the gauge head 131 (step S5). Thus, the position of the detector 131 can be calibrated.

When measurement is carried out after such calibration is carried out, the position signal output from the detecting instrument 130 indicates a precise position including no position error. Therefore, when tooth thickness measurement is carried out after this calibration, precise tooth thickness measurement can be carried out (step S6).

In this manner, the method of calibrating the gear measuring device according to the present invention utilizes the characteristics that: the measurement error e2 included in the tooth profile gradient error $\alpha2$ obtained by the second method (method of scanning in the radial direction) is large; the measurement error e1 included in the tooth profile gradient error $\alpha1$ obtained by the first method (method of scanning in the tangential direction of the base circle) is little; and, when the same tooth surface is measured by the two methods, the influence of the tooth profile gradient errors of the gear per se can be cancelled out; and the method of calibrating the gear measuring device determines that the position error $\Delta x$ is present at the position of the gauge head 131 if there is the difference $\Delta\alpha$ between the tooth profile gradient errors which is the difference between the tooth profile gradient error $\alpha2$ and the tooth profile gradient error $\alpha1$.

When the position error is determined to be present in this manner, the position error $\Delta x$ of the gauge head 131 is calculated based on the difference $\Delta\alpha$ between the tooth profile gradient errors, and calibration is carried out so that the calculated position error $\Delta x$ is eliminated.

Regarding the fact that the influence of the tooth profile shape is exerted on the calculations of the tooth profile gradient errors $\alpha1$ and $\alpha2$, the influence thereof is equalized when the same tooth surface is used as the tooth surface measured by the two methods. Therefore, this influence can be also cancelled out in the calculation of the expression (3). Therefore, the gear required for the calibration is not required to be a highly-precise one like a master gear, and a gear during processing can be also used.

The calibration of the position of the gauge head 131 can be carried out only by the arithmetic processing in this manner. Therefore, the necessity of using a mechanical reference member is eliminated, and the time for attaching/reattaching the mechanical reference member can be eliminated.

The scanning direction of the second method (method of scanning in the direction other than the tangential direction of the base circle) may be a direction other than that of the radius, and precision of the calibration can be further enhanced by a method described below.

According to the expression (5), the sensitivity of $\Delta\alpha$ of the difference between the tooth profile gradient errors with respect to the position error $\Delta x$ of the gauge head 131 is $$\Delta\alpha/\Delta x = (\tan \alpha21 - \tan \alpha22).$$

$\alpha21$ and $\alpha22$ are the values determined depending on the gear specifications according to (6) and (7), and $(\tan \alpha21 - \tan \alpha22)$ means a difference in the contact angles of the gauge head 131 and the work W. The difference in the contact angles of the head gauge 131 and the work W can be increased in order to increase the sensitivity.

Figure 7:
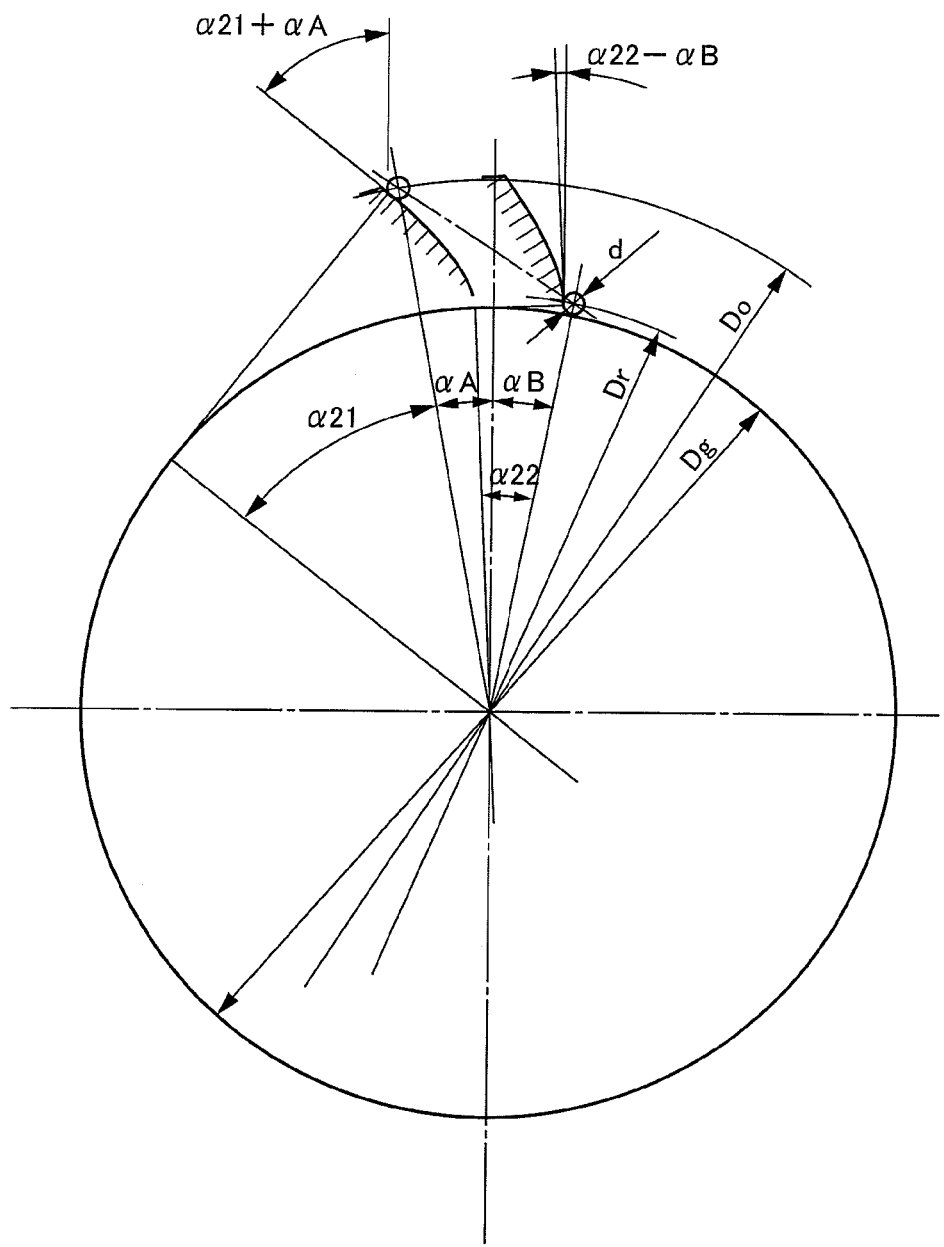
FIG. 7 is a characteristic drawing showing the gear specifications of the work, a tooth-tip measurement offset angle, and a tooth-root measurement offset angle.
Figure 8:
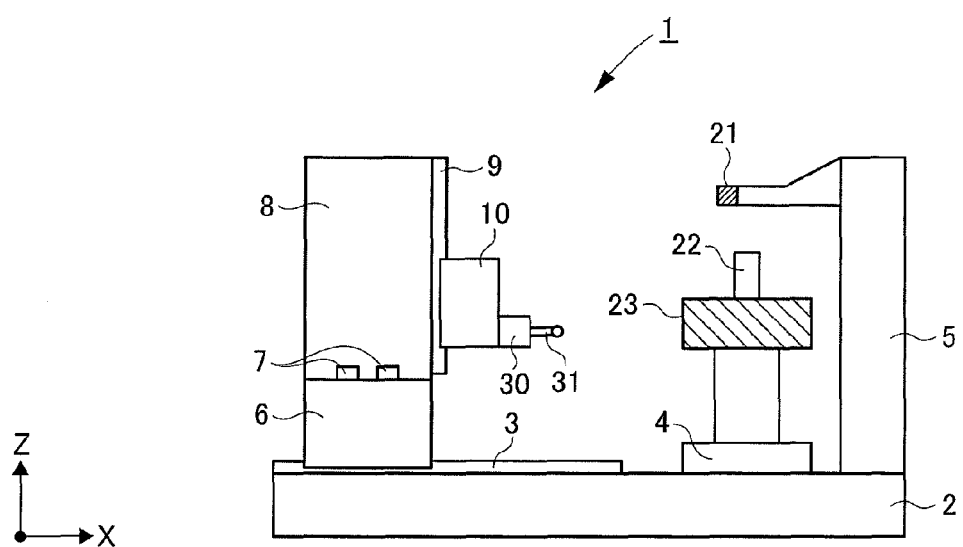
FIG. 8 is a configuration drawing showing a gear measuring device according to a conventional technique.

Therefore, when a tooth-tip measurement position and a tooth-root measurement position are offset as shown in FIG. 7, the difference in the contact angles of the gauge head 131 and the work W can be increased. More specifically, $\alpha A$ serves as a tooth-tip measurement offset angle, $\alpha B$ serves as a tooth-root measurement offset angle, $\tan \alpha21$ is increased to $(\tan \alpha21 + \alpha A)$, and $\tan \alpha22$ is decreased to $(\tan \alpha22 - \alpha B)$ to increase the sensitivity to $\{\tan(\alpha21 + \alpha A) - \tan(\alpha22 - \alpha B)\}$.

As a result, the sensitivity $(\Delta\alpha/\Delta x)$ becomes that as shown by a below expression (8), the position error $\Delta x$ of the gauge head 131 becomes that shown by a below expression (9), the sensitivity can be increased than the case shown in FIG. 6 in which scanning is carried out in the radial direction, and calibration precision can be increased.

$$(\Delta\alpha/\Delta x) = \{\tan(\alpha21 + \alpha A) - \tan(\alpha22 - \alpha B)\} \quad (8)$$

$$\Delta x = \Delta\alpha/\{\tan(\alpha21 + \alpha A) - \tan(\alpha22 - \alpha B)\} \quad (9)$$

If the radial direction is employed as the direction of the scanning movement of the gauge head 131 in the direction other than the tangential direction of the base circle, $\alpha A = 0$, and $\alpha B = 0$ are obtained; and, in this case, the position error $\Delta x$ becomes that shown by above described expression (5).

More specifically, the expression (9) is a general expression representing the position error $\Delta x$, and the expression (5) is a specific expression representing the position error $\Delta x$ in the case in which the moving direction of the gauge head 131 is specified to be the radial direction.

REFERENCE SIGNS LIST 1, 11, 101 GEAR MEASURING DEVICE
2, 12, 102 BASE
3, 7, 9, 13, 17, 19, 103, 107, 109 GUIDE RAILS
4, 14, 104 ROTATING TABLE
5 SUPPORT COLUMN
6, 8, 19, 16, 18, 20, 106, 108, 110 MOVABLE BODY

21 REFERENCE BLOCK
22 TEST BAR
23 MASTER WORK
30, 130 MEASURING INSTRUMENT
31, 131 GAUGE HEAD
140 CONTROL ARITHMETIC DEVICE
W WORK

The invention claimed is:

1. A method of calibrating a gear measuring device having:
   a measuring instrument that outputs a position signal indicating a position at which a gauge head is in contact with a measurement gear when the gauge head is brought into contact with a tooth surface of the measurement gear and that is driven along directions of three-dimensional directions; and
   an arithmetic means that carries out measurement of the measurement gear by subjecting the position signal to arithmetic processing; the method comprising:
   a step of bringing, by the measuring instrument, the gauge head into contact with a tooth surface of the measurement gear when the measurement gear is rotated about a rotational axis thereof in synchronization with movement of the gauge head in a tangential direction of a base circle and outputting the position signal;
   a step of obtaining, by a control device, a tooth profile of the measurement gear by subjecting the position signal to arithmetic processing and of obtaining a first tooth profile gradient error ($\alpha 1$) of the measurement gear from the tooth profile;
   a step of bringing, by the measuring instrument, the gauge head into contact with the tooth surface of the measurement gear when the measurement gear is rotated about the rotational axis thereof in synchronization with movement of the gauge head in a direction other than the tangential direction of the base circle and outputting the position signal;
   a step of obtaining, by the control device, a tooth profile of the measurement gear by subjecting the position signal to arithmetic processing and of obtaining a second tooth profile gradient error ($\alpha 2$) of the measurement gear from the tooth profile;
   a step of calculating, by the control device, a difference ($\Delta\alpha$) between the tooth profile gradient errors that is a difference between the first tooth profile gradient error ($\alpha 1$) and the second tooth profile gradient error ($\alpha 2$);
   a step of obtaining, by the control device, a position error ($\Delta x$) of the gauge head by using the difference ($\Delta\alpha$) between the tooth profile gradient errors and using a gear specification of the measurement gear; and
   a step of calibrating, by the control device, the position of the gauge head based on the position error ($\Delta x$).

2. The method of calibrating the gear measuring device according to claim 1, wherein,
   in the step of obtaining the position error ($\Delta x$) of the gauge head by using the difference ($\Delta\alpha$) between the gear profile gradient errors and the gear specification of the measurement gear,
   the position error ($\Delta x$) is obtained by using a below expression:

$$\Delta x = \Delta\alpha / \{\tan(\alpha 21 + \alpha A) - \tan(\alpha 22 - \alpha B)\}$$

wherein $\alpha A$ represents a tooth-tip measurement offset angle, $\alpha B$ represents a tooth-root measurement offset angle, $\alpha 21$ and $\alpha 22$ are values given by the gear specification; and $$\alpha 21 = \tan^{-1}[(Do^2 - Dg^2)^{0.5} + d]/Dg]$$ and $$\alpha 22 = \tan^{-1}[(Dr^2 - Dg^2)^{0.5} + d]/Dg]$$

are satisfied when a base-circle diameter of the measurement gear is Dg, an outer diameter is Do, a tooth-root diameter is Dr, and a ball diameter of the gauge head is d.

* * * * *